United States Patent
Willis et al.

(10) Patent No.: US 6,728,858 B2
(45) Date of Patent: Apr. 27, 2004

(54) METHOD AND APPARATUS INCLUDING HEURISTIC FOR SHARING TLB ENTRIES

(75) Inventors: Thomas E. Willis, Mountain View, CA (US); Achmed R. Zahir, Menlo Park, CA (US)

(73) Assignee: Intel Corporation, Santa Clara, CA (US)

(*) Notice: Subject to any disclaimer, the term of this patent is extended or adjusted under 35 U.S.C. 154(b) by 347 days.

(21) Appl. No.: 09/894,529

(22) Filed: Jun. 27, 2001

(65) Prior Publication Data

US 2002/0144081 A1 Oct. 3, 2002

Related U.S. Application Data

(63) Continuation-in-part of application No. 09/823,472, filed on Mar. 30, 2001.

(51) Int. Cl.[7] .......................... G06F 12/08; G06F 12/10
(52) U.S. Cl. ..................... 711/206; 711/147; 711/150; 711/152; 711/207
(58) Field of Search ................................ 711/147, 206, 711/207, 208, 209, 150, 151, 152, 153

(56) References Cited

U.S. PATENT DOCUMENTS 5,754,818 A    5/1998  Mohamed
5,893,166 A    4/1999  Frank et al.
6,085,296 A    7/2000  Karkhanis et al.
6,105,113 A    8/2000  Schimmel
6,138,226 A  * 10/2000  Yoshioka et al. ........... 711/210
6,260,131 B1   7/2001  Kikuta et al.
6,289,432 B1   9/2001  Ault et al.
6,564,311 B2   5/2003  Kakeda et al.
6,598,050 B1   7/2003  Bourekas

* cited by examiner

Primary Examiner—Mano Padmanabhan
Assistant Examiner—Midys Inoa
(74) Attorney, Agent, or Firm—Blakely, Sokoloff, Taylor & Zafman LLP

(57) ABSTRACT

A sharing mechanism is herein disclosed for multiple logical processors using a translation lookaside buffer (TLB) to translate virtual addresses into physical addresses. The mechanism supports sharing of TLB entries among logical processors, which may access address spaces in common. The mechanism further supports private TLB entries among logical processors, which may each access a different physical address through identical virtual addresses. The sharing mechanism provides for installation and updating of TLB entries as private entries or as shared entries transparently, without requiring special operating system support or modifications. Sharability of virtual address translations by logical processors may be determined by comparing page table physical base addresses of the logic processors. Using the disclosed sharing mechanism, fast and efficient virtual address translation is provided without requiring more expensive functional redundancy.

26 Claims, 16 Drawing Sheets

METHOD AND APPARATUS INCLUDING HEURISTIC FOR SHARING TLB ENTRIES

This is a continuation-in-part of application Ser. No. 09/823,472 of Willis et al., filed on Mar. 30, 2001 and entitled, "Method and Apparatus for Sharing TLB Entries".

FIELD OF THE INVENTION

This invention relates generally to the field of computer systems, and in particular, to sharing translation lookaside buffer (TLB) entries among multiple logical processors.

BACKGROUND OF THE INVENTION

Computing systems use a variety of techniques to improve performance and throughput. One technique is known in the art as multiprocessing. In multiprocessing, multiple processors perform tasks in parallel to increase throughput of the overall system.

A variation of multiprocessing is known in the art as multithreading. In multithreading, multiple logical processors, which may comprise a single physical processor or multiple physical processors, perform tasks concurrently. These tasks may or may not cooperate with each other or share common data. Multithreading may be useful for increasing throughput by permitting useful work to be performed during otherwise latent periods, in which the performance level of the overall system might suffer.

Another technique to improve performance and throughput is known in the art as pipelining. A pipelined processor performs a portion of one small task or processor instruction in parallel with a portion of another small task or processor instruction. Since processor instructions commonly include similar sequences of component operations, pipelining has the effect of reducing the average duration required to complete an instruction by working on component operations of multiple instructions in parallel.

One such component operation is a translation from virtual addresses to physical addresses. This operation is often performed by using a translation lookaside buffer (TLB). It is a function of the TLB to permit access to high-speed storage devices, often referred to as caches, by quickly translating a virtual address from a task, software process or thread of execution into a physical storage address.

In systems which permit multiprocessing, including those systems that permit multithreading, identical virtual addresses from two different threads or software processes may translate into two different physical addresses. On the other hand, multiple threads or software processes may share a common address space, in which case some identical virtual addresses may translate into identical physical addresses. To prevent mistakes in accessing high-speed storage, the data may be stored according to physical addresses instead of virtual addresses.

If a high-speed storage device is accessed by multiple logical processors, the size of the TLB may be increased to allow storage of virtual address translations for each logical processor or thread of execution. Unfortunately, the time required to perform a virtual address translation increases with the size of the TLB, thereby reducing access speed and overall system performance. Alternatively, smaller faster TLBs may be physically duplicated for each logical processor, but physically duplicating these hardware structures may be expensive. Furthermore, in cases where multiple threads or software processes share a common address space, the TLB entries may include duplicates of some virtual address translations, thereby wasting space in this expensive resource. Providing private TLBs in a multithreaded processor, therefore, inefficiently uses this resource and prevents the logical processors from sharing translations when they share code or data. The inability to share translations is particularly harmful to the performance of multithreaded software, such as a database, wherein the logical processors often run threads that share a single address space. Sharing TLBs allows logical processors to dynamically partition the available resources based on the run-time needs of each processor and share translations, leading to more efficient use of the resource.

BRIEF DESCRIPTION OF THE DRAWINGS

The present invention is illustrated by way of example and not limitation in the figures of the accompanying drawings, in which.

DETAILED DESCRIPTION

Figure 1:
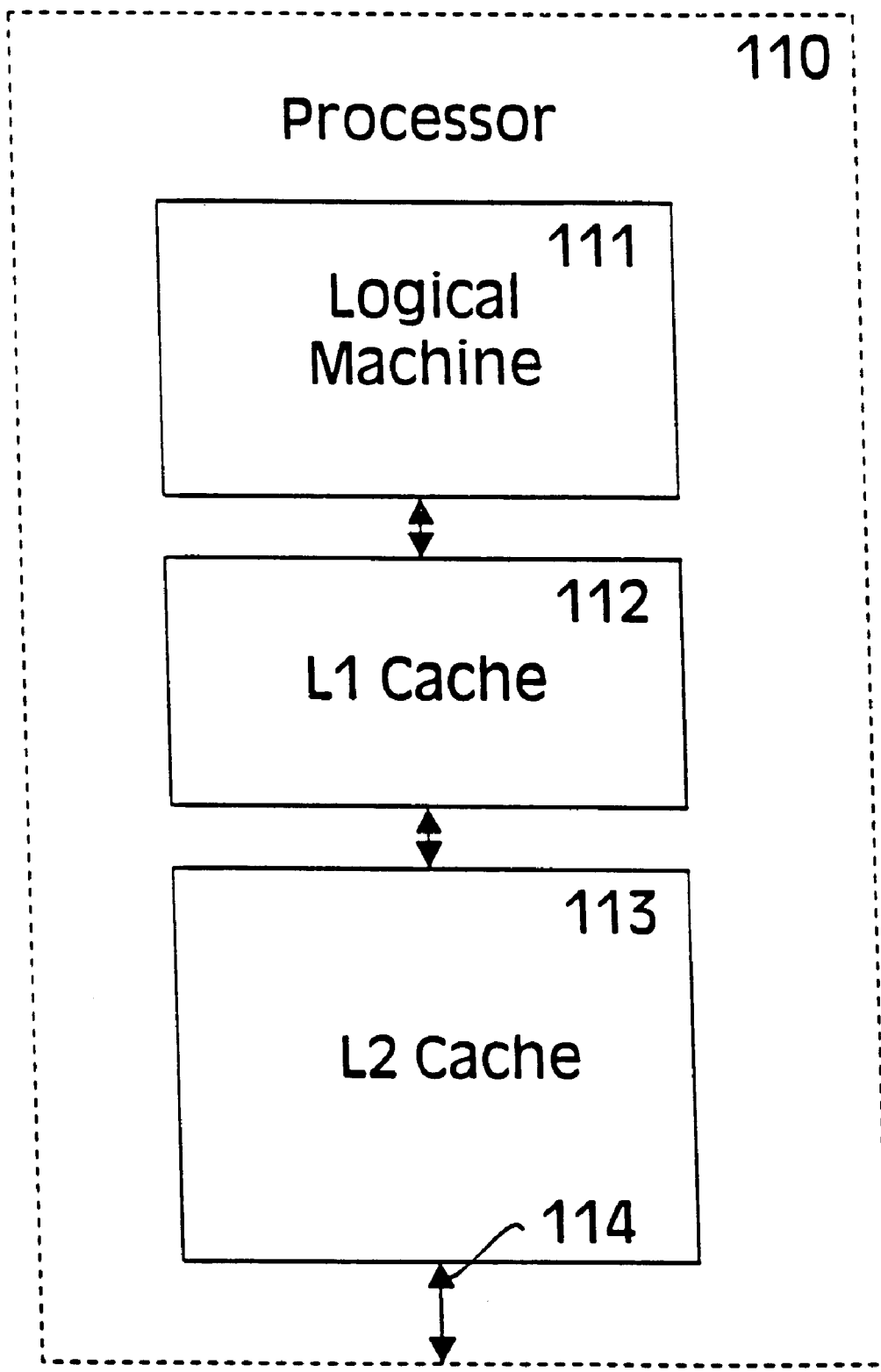
FIG. 1 illustrates a system level abstraction of a single processor.

Disclosed herein is a mechanism for sharing among multiple logical processors, a translation lookaside buffer (TLB) to translate virtual addresses, for example into physical addresses. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

As described in greater detail below, the mechanism supports sharing of TLB entries among logical processors, which may access address spaces in common. The mechanism further supports private TLB entries among logical processors, which for example, may each access a different physical address through identical virtual addresses. The disclosed mechanism provides for installation and updating of TLB entries as private entries or as shared entries transparently, without requiring special operating system support or modifications. Through use of the disclosed sharing mechanism, fast and efficient virtual address translation is provided without requiring more expensive duplicate circuitry.

For the purpose of the following disclosure, a processor or logical processor may be considered to include, but is not limited to, a processing element having access to an execution core for executing operations according to an architecturally defined or micro-architecturally defined instruction set. A processor or logical processor may at times, for the purpose of clarity, be logically identified with a machine state and a sequence of executable operations, also referred to herein as a thread of execution, task or process. The physical boundaries of multiple processors or logical processors may, accordingly, be permitted to overlap each other. For this reason, references may be made to a logical machine in order to distinguish it from a processor or logical processor, which may physically or functionally overlap with another processor or logical processor, these distinctions being made for the purpose of illustration rather than for the purpose of restriction.

Abstraction levels, such as system level abstractions, platform level abstractions and hardware level abstractions may, for the purpose of the following disclosure, be considered to include, but are not limited to, specified interfaces. Details of these specified interfaces are to permit design teams to engineer hardware, firmware or software components to work with, or communicate with, components of different or adjacent abstraction levels within a system. It will be appreciated that an implementation that supports or adheres to one or more of these abstraction level specifications further includes details such as any necessary circuitry, state machines, memories, procedures or other functional components, the complexities of these components varying according to design tradeoffs. It will be further appreciated that such details and variations are generally not shown in the associated abstraction level interfaces.

FIG. 1 illustrates one embodiment of a system level abstraction of a single processor 110. Processor 110 includes a processing element, logical machine 111; a cache storage resource, L1 cache 112; a cache storage resource, L2 cache 113, and a data transmission resource 114.

Figure 2:
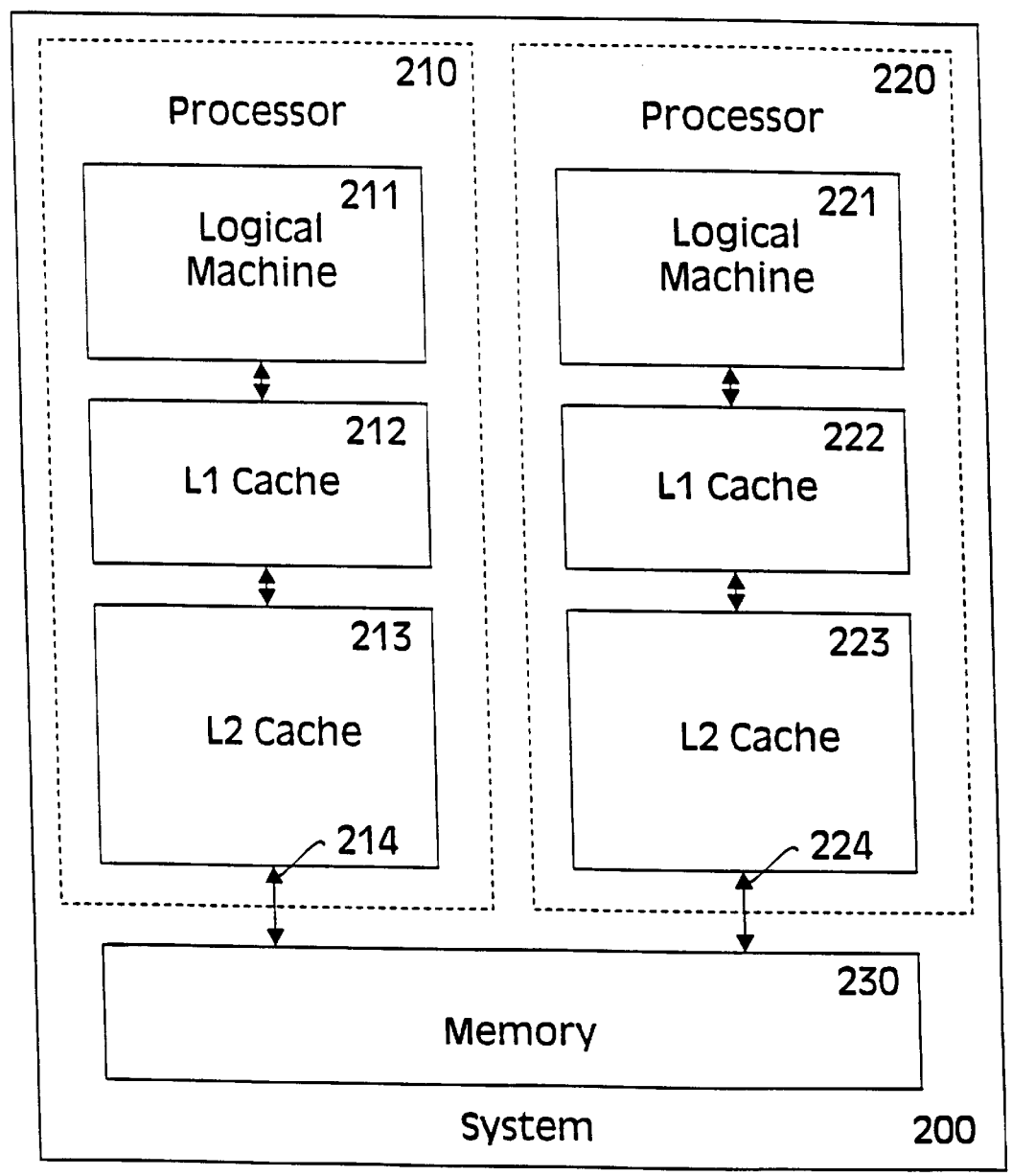
FIG. 2 illustrates a dual processor system based on the system level abstraction of single processors.

FIG. 2 illustrates a dual processor system 200 based on the system level abstraction of single processors from FIG. 1. Dual processor system 200 comprises a central storage, memory 230; a first processor, processor 210 including logical machine 211, L1 cache 212, L2 cache 213, and data transmission resource 214; and a second processor, processor 220 including logical machine 221, L1 cache 222, L2 cache 223, and data transmission resource 224. It will be appreciated that not all of the logically identical resources need to be duplicated for each of the processors. For example, it may be more efficient to physically share a resource among multiple processors while preserving the logical appearance of multiple single processors, each having a complete set of resources.

Figure 3:
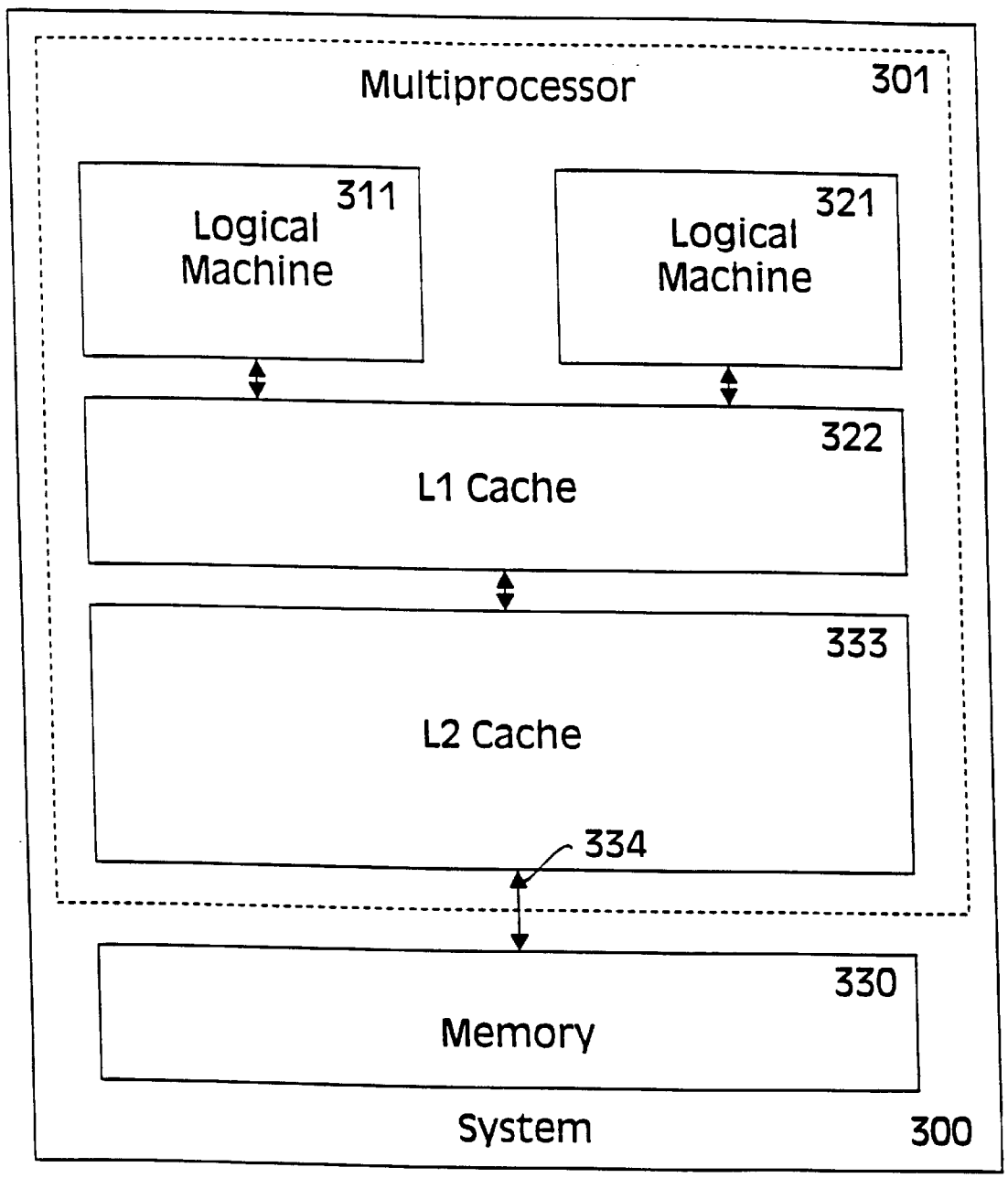
FIG. 3 illustrates a dual processor system including a multiprocessor with shared resources.

FIG. 3 illustrates a dual processor system including one embodiment of a multiprocessor 301 with shared resources, as part of a system 300. System 300 also includes memory 330. Multiprocessor 301 also includes first logical machine 311 having shared access to L1 cache 322 and a second logical machine 321 having shared access to L1 cache 322. Both logical machine 311 and logical machine 321 also have shared access to L2 cache 333, and data transmission resource 334. Shared L1 cache 322 and shared L2 cache 333 may be used, for example, to store copies of data or instructions transmitted via data transmission resource 334 from memory 330 for either logical machine 311 or logical machine 321.

Both logical machine 311 and logical machine 321 may access and exercise control over L1 cache 322, L2 cache 333 and data transmission resource 334, and so it may be advantageous to access data according to physical addresses for these shared resources to prevent mistakes. One way in which access and control may be provided to multiple logical machines, as shown in FIG. 4a, includes a platform level abstraction (PLA) 411, and a hardware level abstraction (HLA) 414.

Figure 4A:
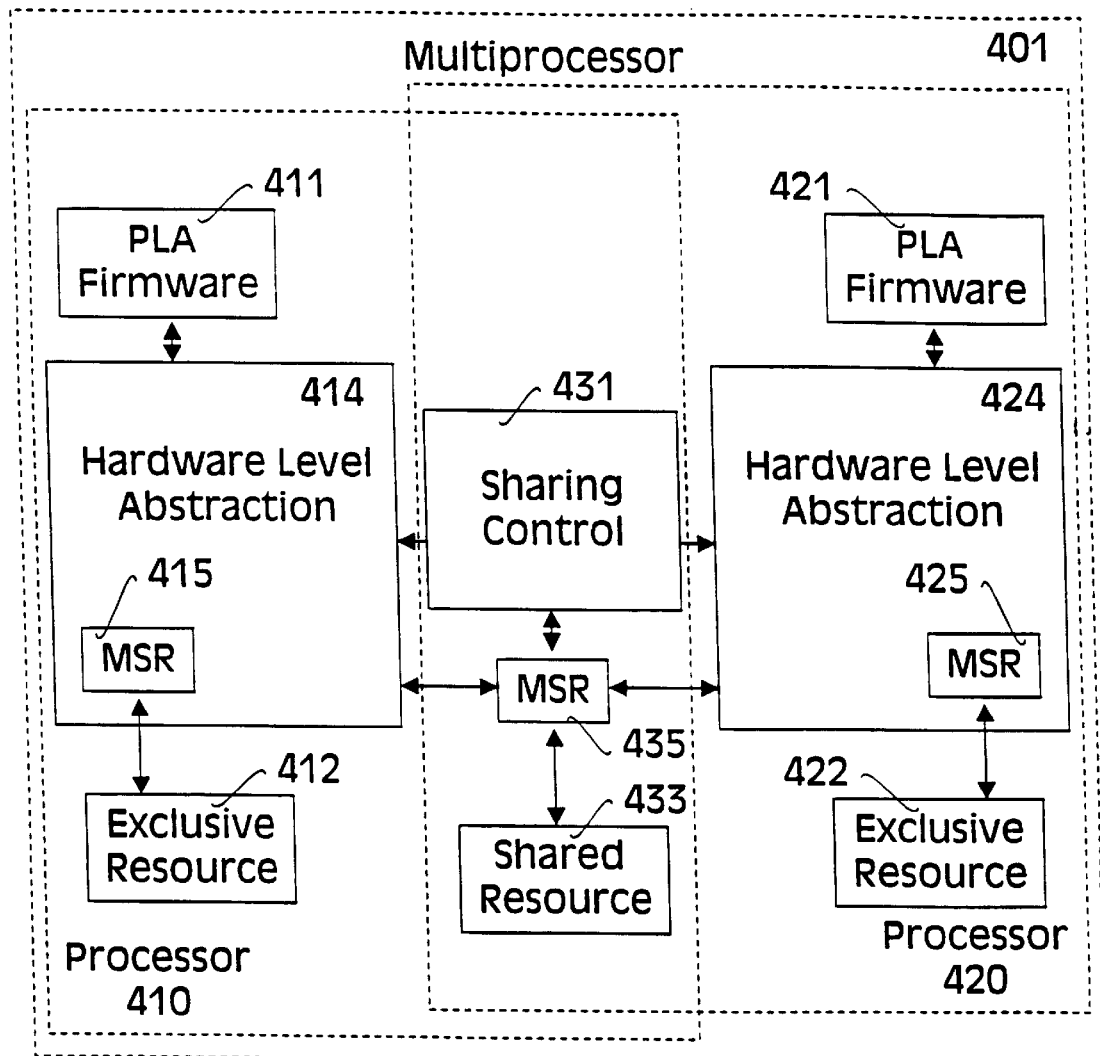
FIG. 4a illustrates one embodiment of a multiprocessor system with resource sharing.

FIG. 4a illustrates an embodiment of a multiprocessor 401 comprising a processor 410 that has access to exclusive resources 412 and shared resource 433 and also comprising a processor 420 that has access to exclusive resources 422 and shared resource 433. Resource 412 and resource 433 represent exclusive and shared resources respectively, for example cache resources, busses or other data transmission resources, virtual address translation resources, protocol resources, arithmetic unit resources, register resources or any other resources accessed through the hardware level abstraction 414. In one embodiment, access to resource 412 or to resource 433 is provided by the hardware level abstraction 414 through a corresponding mode specific register (MSR). For example, access to exclusive resource 412 is accomplished through hardware level abstraction 414 by providing for PLA firmware to perform a write operation to the corresponding MSR 415. Access to shared resource 433 is accomplished through hardware level abstraction 414 by providing for PLA firmware 411 to perform a write operation to the corresponding MSR 435. Sharing control 431 provides and coordinates access to shared resource 433 and to the corresponding MSR 435.

Similarly, access to exclusive resource 422 is provided through hardware level abstraction 424 by PLA firmware 421 performing a write operation to corresponding MSR 425. Access to shared resource 433 is provided through hardware level abstraction 424 by PLA firmware 421 performing a write operation to corresponding MSR 435 with sharing control 431 providing and coordinating access to the corresponding MSR 435, and thereby to shared resource 433.

Figure 4B:
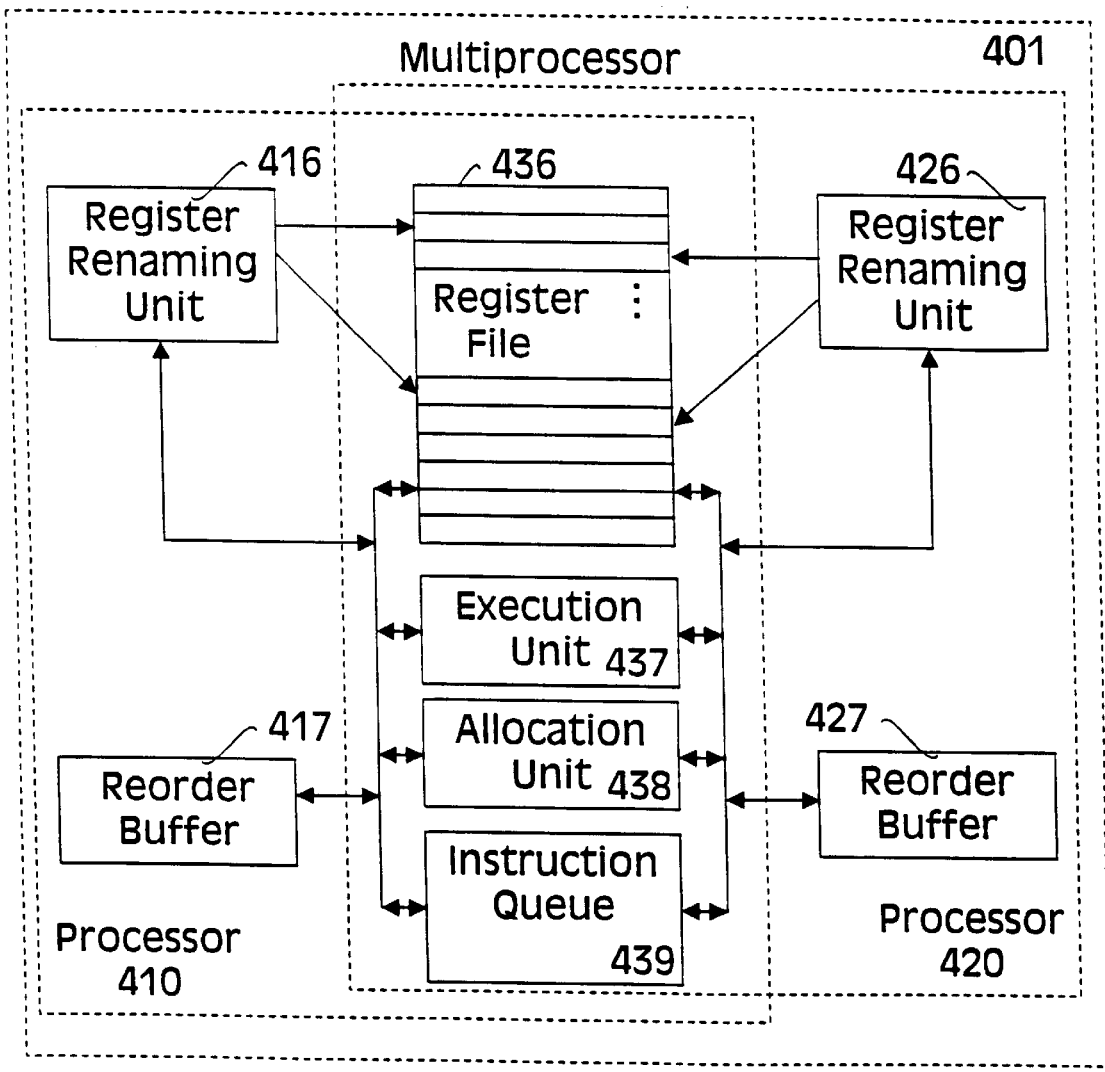
FIG. 4b illustrates an alternative embodiment of a multiprocessor system with resource sharing.

FIG. 4b illustrates an alternative embodiment of a multiprocessor 401 comprising a processor 410 and a processor 420 that have access to shared resources including register file 436, execution unit 437, allocation unit 438, and instruction queue 439. Additionally processor 410 has exclusive access to register renaming unit 416 and reorder buffer 417, and processor 420 has exclusive access to register renaming unit 426 and reorder buffer 427.

Instruction queue 439 contains instructions associated with a thread of execution for processor 410 and instructions associated with a thread of execution for processor 420. Allocation unit 438 allocates register resources from register file 436 to register renaming unit 416 for instructions in instruction queue 438 associated with the thread of execution for processor 410. Execution unit 437 executes instructions from instruction queue 438 associated with the thread of execution for processor 410 and then reorder buffer 417 retires the instructions in sequential order of the thread of execution for processor 410.

Allocation unit 438 further allocates register resources from register file 436 to register renaming unit 426 for instructions in instruction queue 438 associated with the thread of execution for processor 420. Execution unit 437 also executes instructions from instruction queue 438 associated with the thread of execution for processor 420 and then reorder buffer 427 retires the instructions in sequential order of the thread of execution for processor 420.

Figure 5:
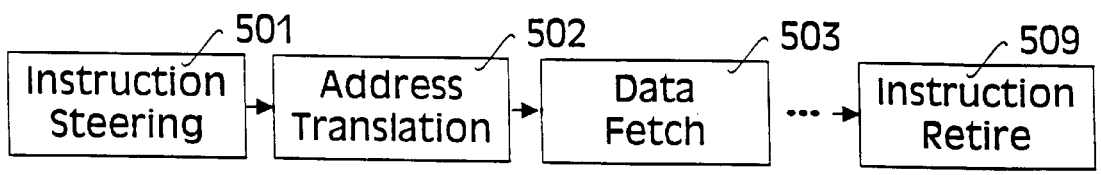
FIG. 5 illustrates one embodiment of a processor pipeline.

Modern processors are often heavily pipelined to increase operating frequencies and exploit parallelism. FIG. 5 illustrates one embodiment of a processor pipeline wherein the front end of the pipeline includes instruction steering stage 501, address translation stage 502, and data fetch stage 503; and the back end of the pipeline culminates with instruction retirement stage 509. Data from successive stages may be stored or latched to provide inputs to the next pipeline stage.

The address translation stage 502 may perform a translation from a virtual address to a physical address using a storage structure called a translation lookaside buffer (TLB).

Figure 6:
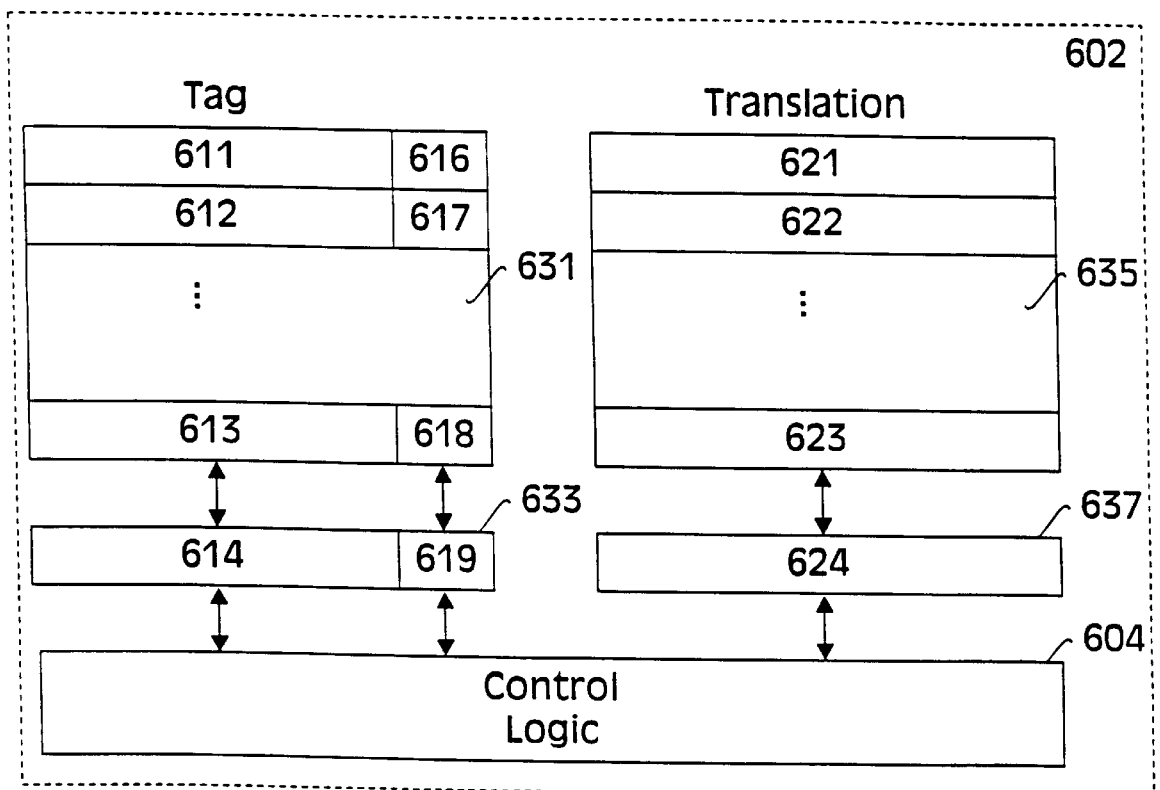
FIG. 6 illustrates one embodiment of a shared TLB used in an address translation stage.

In one embodiment, an apparatus provides shared virtual address translation entries of a TLB 602 for use in address translation stage 502. FIG. 6 shows a tag array 631 for storing virtual address data (VAD) which may comprise, for example, a virtual page number. The figure also shows a translation array 635 for storing: corresponding physical address data (PAD) which may comprise, for example, a physical page number; address space identifier data (ASID); attributes (ATRD) such as page size data, security data, privilege data, etc.; and other associated data. Tag array 631 includes data line 611 and corresponding sharing indication 616, data line 612 and corresponding sharing indication 617, other data lines and corresponding sharing indications and finally, data line 613 and corresponding sharing indication 618. Translation array 635 includes data line 621, data line 622, other data lines and finally, data line 623.

When data is read from tag array 631 and from corresponding translation array 635 it is may be latched by latch 633 and latch 637 respectively. Latch 633 includes both data portion 614 for storing virtual address data (VAD) and sharing indication 619 for identifying if the corresponding virtual address translation may be used in correspondence with a logical processor requesting the virtual address translation. The latch 637 includes, in data portion 624, a corresponding physical address data (PAD); an address space identifier data (ASID); attributes (ATRD) such as, page size data, security data, privilege data, etc.; and other associated data for translating the virtual address and for checking if the latched output of translation array 635 may be shared.

Control logic 604 may use the data portion 614, sharing indication 619, and data portion 624 to identify if the virtual address translation is sharable. For example, if a processor initiates a TLB request to look up a virtual address translation and the TLB entry in latches 633 and 637 contains an ASID that matches the ASID for the virtual address to be translated, and further if the entry contains a VAD that matches the VAD for the virtual address, and finally if sharing indication 619 indicates a set of logical processes including one associated with the processor initiating the TLB request, then the entry in latch 633 and latch 637 may be used to translate the virtual address. Otherwise, control logic 604 may initiate installation of a new virtual address translation entry for TLB 602.

Whenever a miss occurs in TLB 602, the physical address data and other TLB data may be recovered from page tables in main memory. For one alternative embodiment control logic 604 may comprise a mechanism for recovering such data. Most modern processors use a mechanism called a page walker to access page tables in memory and compute physical addresses on TLB misses.

If a processor, either directly through software or indirectly through control logic 604, initiates a TLB request to installation of a new virtual address translation entry, the TLB 602 may be searched for any existing entries that can be shared. An entry retrieved from tag array 631 and translation array 635 may then be latched by latch 633 and latch 637 respectively. If the TLB entry in latches 633 and 637 contains an ASID that matches the ASID for the virtual address to be translated, and further if the entry contains a VAD that matches the VAD for the virtual address, and finally if sharing indication 619 indicates a shared status, then the entry in latch 633 and latch 637 may be installed for the processor initiating the TLB request by adding the logical process associated with the initiating processor to the set of logical processes indicated by sharing indication 619 and thereafter the TLB entry may be used to translate the virtual address. Otherwise, control logic 604 may initiate allocation of a new virtual address translation entry for TLB 602.

If a processor, either directly through software or indirectly through control logic 604, initiates a TLB request to allocate a new virtual address translation entry, the TLB 602 may be searched for any invalid or replaceable entries. The retrieved TLB entry may then be reset by control logic 604 to contain an ASID that matches the ASID for the virtual address to be translated, a VAD that matches the VAD for the virtual address, a PAD that matches the PAD of the translated physical address, an ATRD that matches the ATRD of the translated physical address, and any other associated data corresponding to the virtual address translation. Finally the entry may be installed for the processor initiating the TLB allocation request by initializing the set of logical processes indicated by sharing indication 619 to contain only the logical process associated with the initiating processor. It will be appreciated that the sharing indication 619 may be conveniently initialized by default to indicate a shared status for the virtual address translation. Alternatively if the allocation was initiated through software, for example, control logic 604 may initialize the sharing indication 619 by default to indicate a private status for the virtual address translation.

When it is desirable for a processor to purge a virtual address translation, the processor initiates a TLB request to look up the virtual address translation entry that translates the virtual address. The retrieved TLB entry may then be reset by control logic 604 by initializing the set of logical processes indicated by sharing indication 619 to the empty set. It will also be appreciated that the sharing indication 619 may be conveniently initialized by default to indicate a private status for the virtual address translation, for example, if no explicit invalid status is representable.

It will be appreciated that control unit 604 provides for efficient sharing of TLB 602 entries among logical processes without requiring additional support from, or modifications to, any particular operating system that may be selected for use in conjunction with a multiprocessor or multithreading processor employing the apparatus of FIG. 6 to provide sharing of virtual address translations in an address translation stage 502. One such multiprocessor or multithreading processor may, for example, execute a 32-bit Intel Architecture (IA-32) instruction set which comprises IA-32 instructions of the Pentium® processor family. Another such multiprocessor or multithreading processor may, for example, execute a 64-bit Intel Architecture (IA-64) instruction set which comprises IA-64 instructions of the Itanium™ processor family or may also execute a combination of both IA-32 and IA-64 instructions. Since such multiprocessors or multithreading processors may be used in various computer systems running any one of a number of operating systems, an apparatus employed by such multiprocessors or multithreading processors to provide sharing of TLB entries should accordingly be operating-system transparent, providing sharing of TLB entries among logical processes without requiring that the operating system actively manage the sharing of all TLB entries. It will also be appreciated that if a multiprocessor or multithreading processor has a mechanism to provide sharing of TLB entries in such a way that is operating-system transparent or operating-system independent, that it does not prohibit that multiprocessor or multithreading processor from also providing for additional operating-system support for managing some sharing of TLB entries.

Figure 7A:
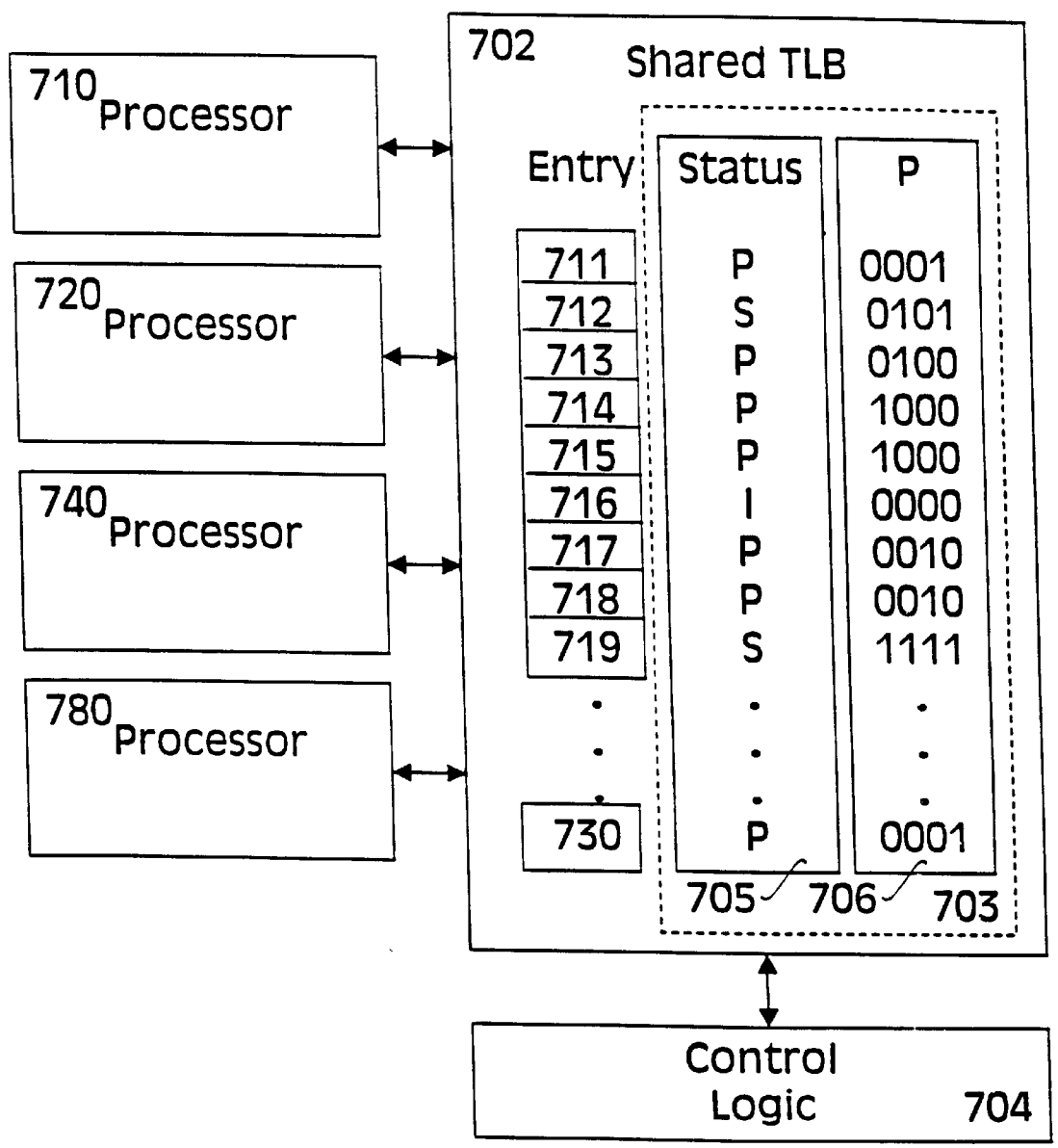
FIG. 7 illustrates alternative embodiments of a shared TLB used in an address translation stage.
Figure 7B:
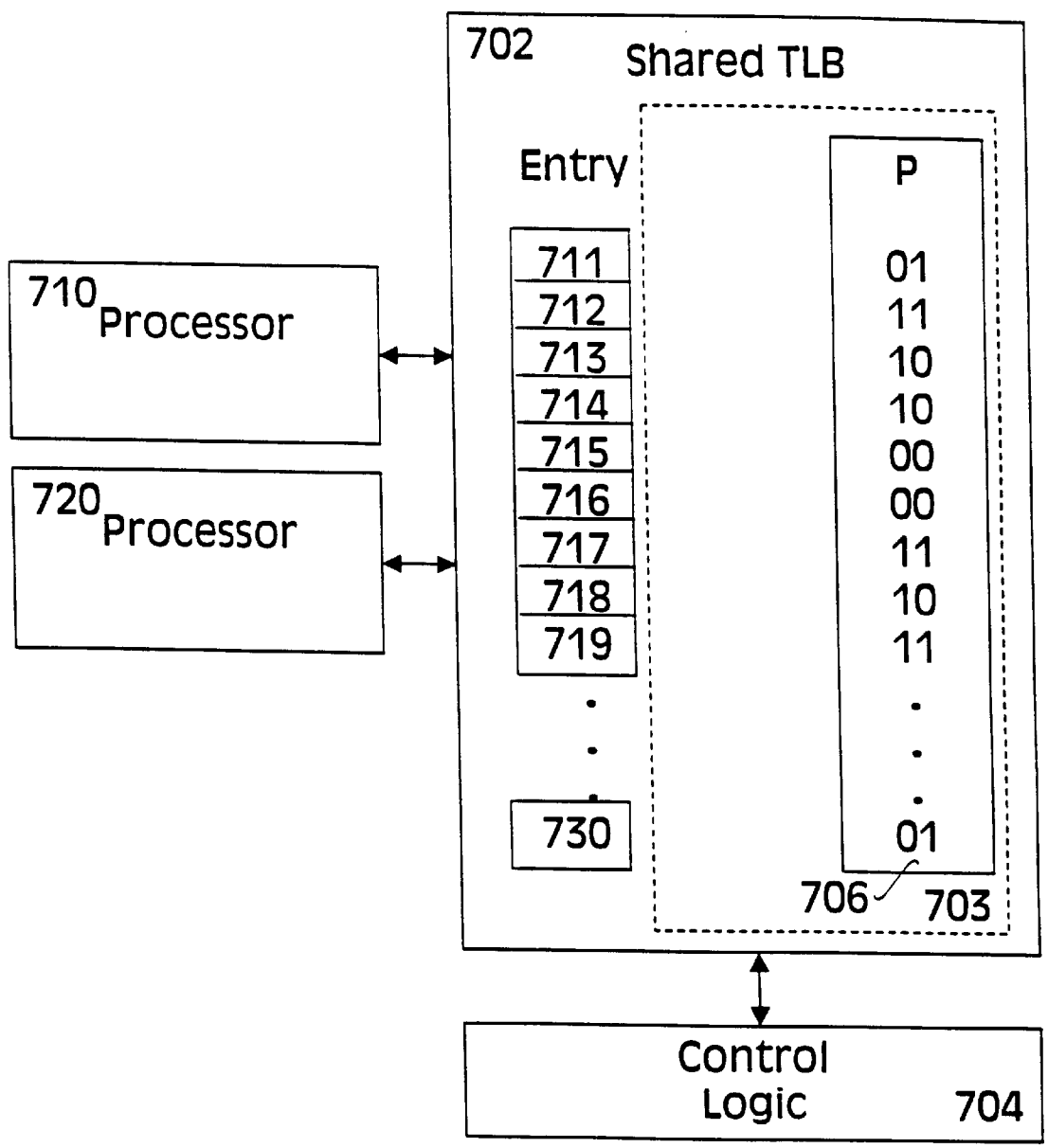

FIG. 7 illustrates alternative operating-system transparent embodiments of a shared TLB 702 used in an address translation stage 502. A scalable sharing indication scheme 703 comprises a status indication and a set of logical processes and associated processors for each corresponding virtual address translation entry in the shared TLB 702. Alternatively, the status indication may be implicitly represented by the set of logical processes and associated processors as illustrated in FIG. 7b. As described above, control logic 704 may be used to identify if a virtual address translation is sharable by the logical processors 710, 720, 740 and 780.

Shared TLB 702 stores virtual address translation entries 711 through 730. A virtual address translation entry may include: a virtual address data (VAD) for example, a virtual page number; a corresponding physical address data (PAD) for example, a physical page number; an address space identifier data (ASID); attribute data (ATRD) such as, page size data, security data, privilege data, etc.; and other associated data for translating the virtual address and for checking if the virtual address translation entry may be shared. Each virtual address translation entry has, in shared TLB 702, a corresponding status indication (in Status 705) and a corresponding indication of the set of logical processes (in P 706) sharing the virtual address translation. When a processor requests a virtual address translation, TLB 702 will be searched for a valid virtual address translation entry having a VAD that matches the VAD of the virtual address to be translated. If the corresponding set of logical processes sharing the virtual address translation includes a process associated with the requesting processor, the entry retrieved may be used to translate the virtual address.

It will be appreciated that a set of logical processes sharing a virtual address translation may indicate inclusion of a process associated with a particular processor by simply indicating or listing that particular processor.

In FIG. 7a, for example, a sharing indication corresponding to virtual address translation entry 711 indicates a private status of P and a set of logical processes of 0001, the low order bit being set to indicate that entry 711 may be used exclusively to translate virtual addresses for processor 710. Similarly a sharing indication corresponding to virtual address translation entry 713 indicates a private status of P and a set of logical processes of 0100, indicating that entry 713 may be used exclusively to translate virtual addresses for processor 740.

A sharing indication corresponding to virtual address translation entry 712 indicates a shared status of S and a set of logical processes of 0101, indicating that entry 712 may be shared and may be used to translate virtual addresses for processors 710 and 740. Similarly a sharing indication corresponding to virtual address translation entry 719 indicates a shared status of S and a set of logical processes of 1111, indicating that entry 719 may be shared and used to translate virtual addresses for all four processors 710–780.

A sharing indication corresponding to virtual address translation entry 716 indicates a invalid status of I and a set of logical processes of 0000 meaning that entry 716 may not be used to translate virtual addresses for any processor 710–780. It will be appreciated that the invalid status may be explicitly represented or implicitly represented by the corresponding set of logical processes. It will also be appreciated that one skilled in the art may produce other encodings to explicitly or implicitly represent sharing indications for TLB entries.

In FIG. 7b, for example, a sharing indication corresponding to virtual address translation entry 711 may implicitly indicate a private status of P and an explicit set of logical processes of 01 meaning that entry 711 may be used to translate virtual addresses for processor 710. It will be appreciated that such an implicit status representation may permit any implicit private status to be changed to an implicit shared status if another processor is found that may make use of the corresponding virtual address translation entry.

For example, if a processor initiates a TLB request to look up a virtual address translation and the sharing indication corresponding to the retrieved TLB entry indicates a set of logical processes that does not include one associated with the processor initiating the TLB request, then the physical address data and other TLB data may be recovered from page tables in main memory. Control logic 704 may include a mechanism for recovering such data, or may invoke a mechanism such as a page walker to access page tables in memory and compute physical addresses. If the newly constructed virtual address translation matches the retrieved TLB entry, the requesting process may be added to the set of logical processes sharing the retrieved TLB entry. Otherwise the newly constructed virtual address translation may be installed in a new TLB entry for the requesting processor.

Figure 8:
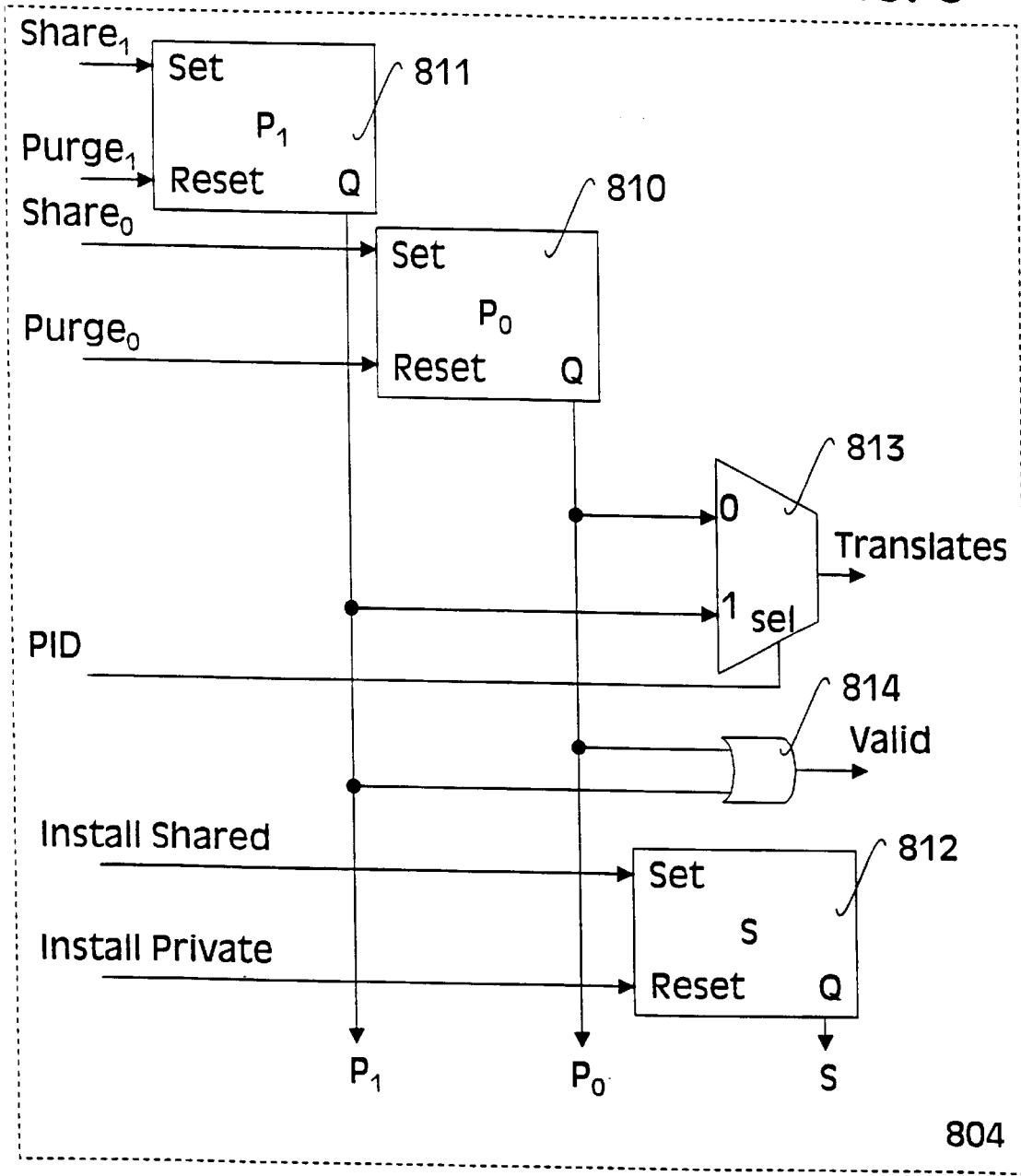
FIG. 8 illustrates one embodiment of control logic circuitry for use with a shared TLB.

FIG. 8 illustrates one embodiment of a control logic 804 for use with a shared TLB. Control logic 804 comprises storage cell 810, storage cell 811, and storage cell 812. Storage cells 810 and 811 may be used to record set of logical processes sharing a virtual address translation entry. Processor $P_0$ may be added to the set of logical processes sharing a virtual address translation by asserting the $Share_0$ input signal to storage cell 810. Likewise, processor $P_1$ may be added to the set of logical processes sharing a virtual address translation by asserting the $Share_1$ input signal to storage cell 811. Either processor $P_0$ or $P_1$ may purge the translation by respectively asserting the $Purge_0$ input signal to storage cell 810 or asserting the $Purge_1$ input signal to storage cell 811. Storage cell 812 may be used to record a corresponding status for the virtual address translation entry. A shared status may be recorded by asserting the Install Shared input signal to storage cell 812. A private status may be recorded by asserting the Install Private input signal to storage cell 812.

Control logic 804 further comprises multiplexer 813 and OR gate 814. If a processor identifier (PID) for a logical processor requesting a virtual address translation is asserted at the select input of multiplexer 813, the output of multiplexer 813 will indicate whether the virtual address translation entry may be readily used to provide the virtual address translation for the requesting processor. If the set of logical processes indicates either logical processor $P_0$ or $P_1$ is sharing the translation then the output of OR gate 814 will indicate that the translation is valid.

It will be appreciated that modifications may be made in arrangement and detail by those skilled in the art without departing from the principles of the invention disclosed and that additional elements, known in the art, may be further incorporated into control logic 804. It will also be appreciated that a control logic for operating-system transparent TLB entry sharing may comprise a combination of circuitry and also machine executable instructions for execution by one or more machines.

Figure 9A:
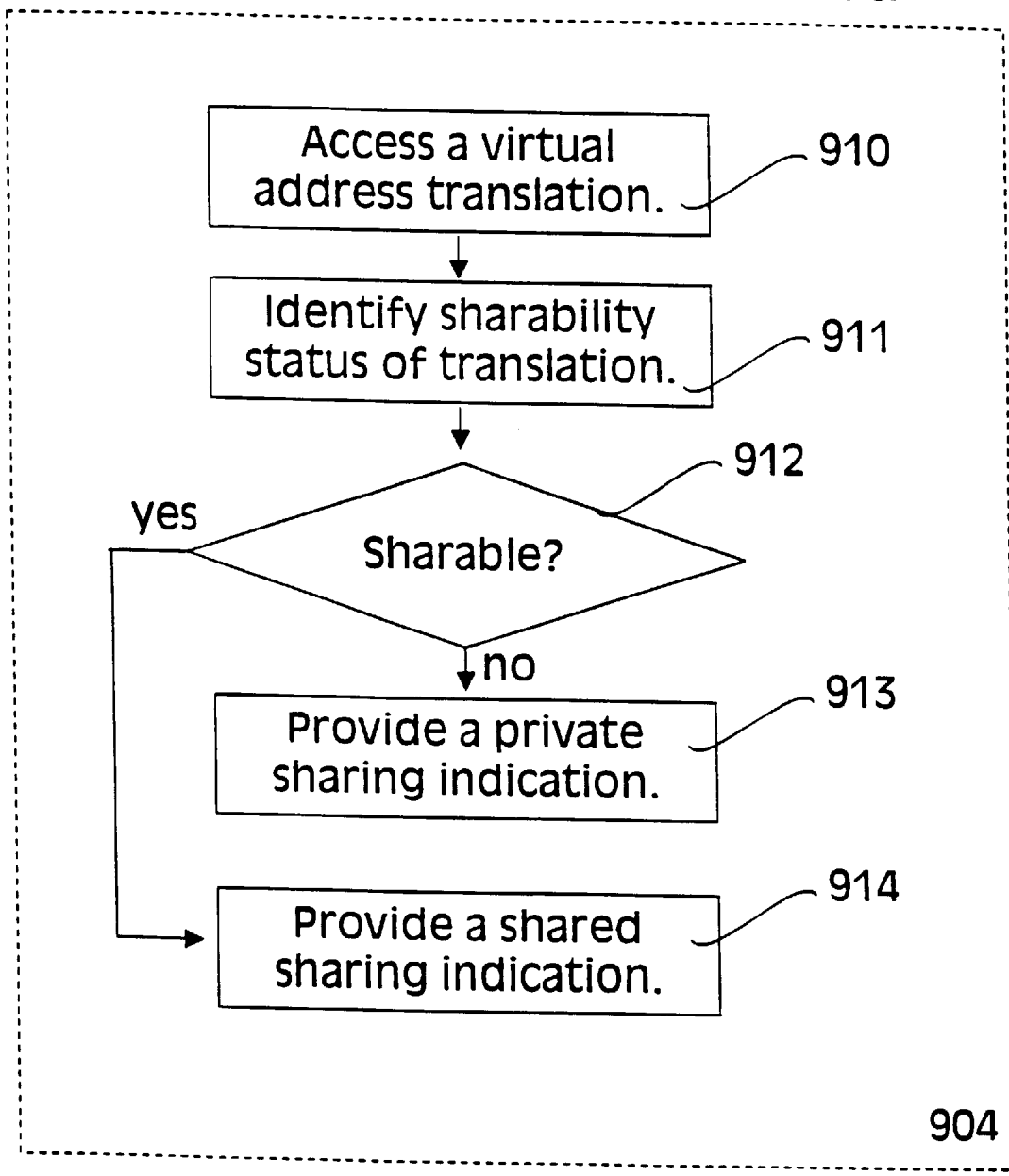
FIG. 9 illustrates alternative embodiments of a control logic process for TLB entry sharing.

FIG. 9a, for example, illustrates a diagram of one embodiment of a process for TLB entry sharing for a control logic 904. The process is performed by processing blocks that may comprise software or firmware operation codes executable by general purpose machines or by special purpose machines or by a combination of both. In processing block 910, a virtual address translation is accessed. In processing block 911, the sharability status of the virtual address translation is identified. In processing block 912, the result of processing block 911 is used to control processing flow. If a sharable status is identified, then processing flow continues in processing block 914, where a sharing indication with a shared status is provided.

Otherwise a private status is identified, and processing flow continues in processing block 913, where a sharing indication with a private status is provided.

Figure 9B:
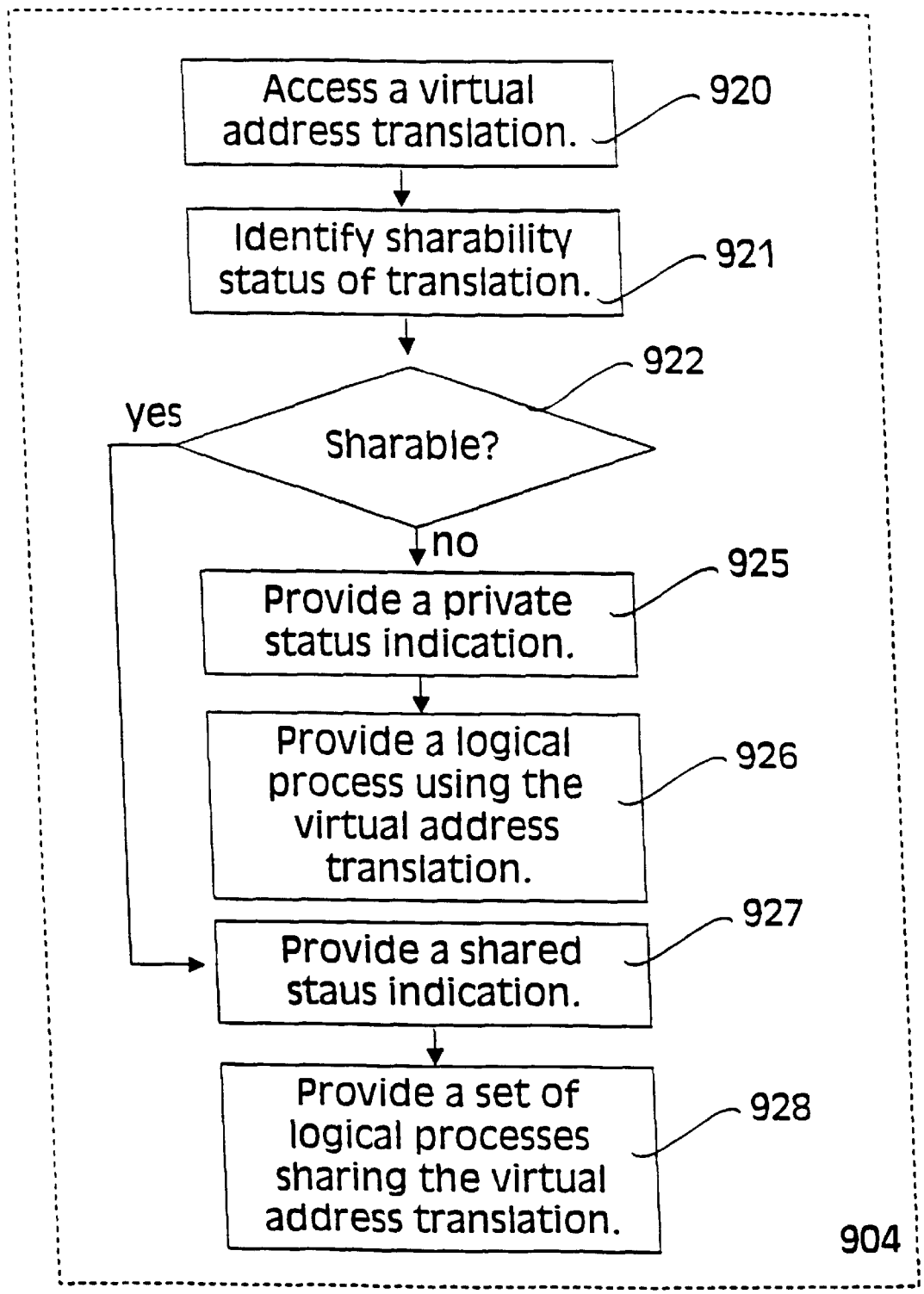

FIG. 9b illustrates a diagram of an alternative embodiment of a process for TLB entry sharing for control logic 904. In processing block 920, a virtual address translation is accessed. In processing block 922, the sharability status of the virtual address translation is identified. In processing block 922, the result of processing block 921 is again used to control processing flow. If a sharable status is identified, then processing flow continues in processing block 927, where again a sharing indication with a shared status is provided. In processing block 928 a set of logical processes sharing the virtual address translation is provided.

Otherwise, in processing block 921, a private status has been identified, and processing flow continues in processing block 925, where a sharing indication with a private status is provided. In processing block 926 a logical process using the virtual address translation is provided.

Figure 9C:
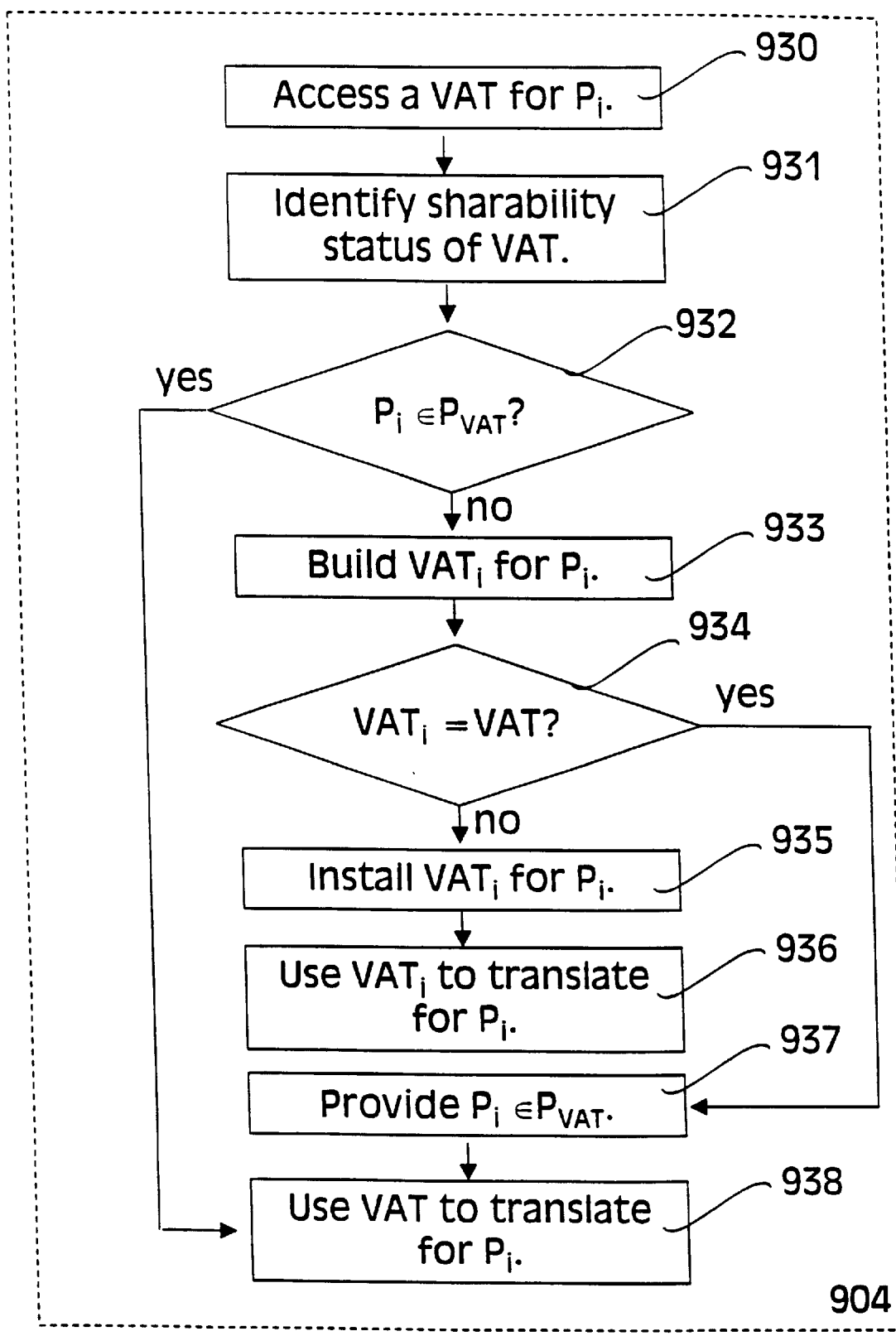

FIG. 9c illustrates a diagram of another alternative embodiment of a process for TLB entry sharing for control logic 904. In processing block 930, virtual address translation VAT is accessed for processor $P_i$. In processing block 931, the sharability status of virtual address translation VAT is identified. In processing block 932, the set $P_{VAT}$ of logical processes sharing virtual address translation VAT is checked to see if a process associated with processor $P_i$ is indicated. The result is used to control processing flow. If processor $P_i$ is indicated as sharing virtual address translation VAT then processing continues in processing block 938 where virtual address translation VAT is used to translate virtual addresses for processor $P_i$.

Otherwise, in processing block 932, processor $P_i$ is not indicated as sharing virtual address translation VAT and processing continues in processing block 933, where a new virtual address translation $VAT_i$ is built from page tables and physical address data is computed for processor $P_i$. In processing block 934 the new virtual address translation $VAT_i$ is checked to see if it matches the retrieved virtual address translation VAT. If so, in processing block 937, the set $P_{VAT}$ of logical processes sharing virtual address translation VAT is provided to indicate that a process associated with processor $P_i$ is sharing virtual address translation VAT; and in processing block 938, virtual address translation VAT is used to translate virtual addresses for processor $P_i$.

Otherwise, in processing block 934 the new virtual address translation $VAT_i$ does not match the retrieved virtual address translation VAT and so in processing block 935 the new virtual address translation VATi is installed into a newly allocated entry in the TLB for processor Pi. In processing block 936, virtual address translation $VAT_i$ is used to translate virtual addresses for processor $P_i$.

Figure 10:
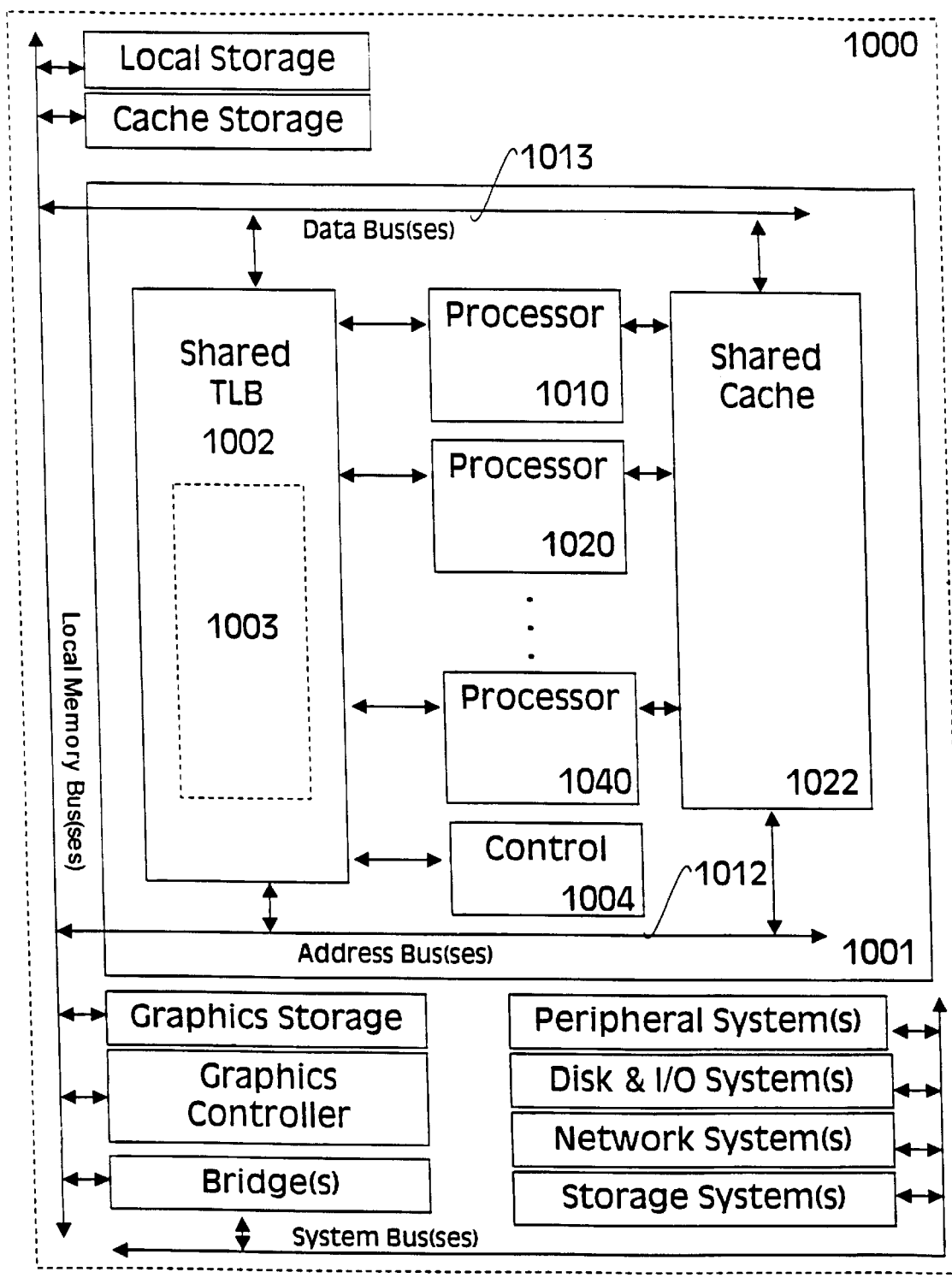
FIG. 10 illustrates one embodiment of a computing system including a multiprocessor with a shared TLB.

FIG. 10 illustrates one embodiment of a computing system 1000 including a multiprocessor 1001 with a shared TLB 1002. Computing system 1000 may comprise a personal computer including but not limited to central processor 1001, graphics storage, other cache storage and local storage; system bus(ses), local bus(ses) and bridge(s); peripheral systems, disk and input/output systems, network systems and storage systems.

It will be appreciated that multiprocessor 1001 may comprise a single die or may comprise multiple dies. Multiprocessor 1001 may further comprise logical processors 1010–1040, shared cache storage 1022, control logic 1004, address busses 1012, data busses 1013, bus control circuitry or other communication circuitry. Shared TLB 1002 further comprises sharing indications 1003 corresponding to virtual address translation entries in TLB 1002. When a logical processor accesses a virtual address translation entry in TLB 1002, the virtual address translation may be identified as sharable or as not sharable. A corresponding sharing indication of the sharing indications 1003 may then be provided for the virtual address translation entry.

Shared TLB 1002 supports operating-system transparent sharing of TLB entries among processors 1010–1040, which may access address spaces in common. Shared TLB 1002 further supports private TLB entries among processors 1010–1040, which for example, may each access a different physical address through identical virtual addresses. Through use of sharing indications 1003, fast and efficient virtual address translation is provided without requiring more expensive functional redundancy.

While a comparison of virtual address translation data may be necessary in the general case, it will be appreciated that specific implementations may permit simplifying assumptions resulting in heuristics for further optimization of the sharing of TLB entries. For example, since multiple logical processors may install different translations for the same virtual address by using corresponding page tables to drive the hardware installation of TLB entries, it may be possible to determine if a set of the logical processors are in fact using the same page tables, in which case all resulting installations of TLB entries may be shared by those processors.

One way to determine if page tables are the same is to compare the physical base addresses of the page tables. These base addresses, or the resulting comparisons of these base addresses, may be cached or stored in hardware to provide default sharing indications for installing virtual address translations. If the base addresses of the page tables are the same, then the resulting translations may be shared. Alternatively, if the base addresses are not the same, it does not necessarily mean that the virtual address translations may not be shared, but rather that the simplifying assumption does not apply.

Further, it may be the most probable case that the base addresses of the page tables are not changed after they are initialized. In this case, the base address comparisons may need to be performed only once. Again, if the base addresses are subsequently changed, it does not necessarily mean that the resulting translations may not be shared or even that the simplifying assumption no longer applies, but rather that the assumption may need to be reconfirmed before assigning a default sharing indication.

Specific implementations will now be described of a heuristic to determine whether virtual address translations in a TLB may be shared between logical processors, based on comparison of page table physical base addresses. The techniques now to be described, while capable of implementation in software, are described in terms of hardware implementation. These techniques do not require any changes to system software that deals with the TLB resources. As a result, these techniques help to allow legacy systems to take advantage of the sharing of TLB entries without changes to the software stack.

The notation phys(V) is used herein to denote the physical address that corresponds to the virtual address of object V, and the notation virt(P) is used to denote the virtual address that corresponds to the physical address of object P. As noted above, some system architectures allow different logical processors to install different translations for the same virtual address V. Consider two logical processors i and j that use page tables $PT_i$ and $PT_j$ to drive their hardware translation installation mechanism. If $PT_i$ is the same as $PT_j$, then it is not possible for these two logical processors to install different translations for some virtual address V, because the memory is shared and coherent (i.e., processors i and j must, by definition, agree on the contents of the page table as memory is coherent and shared).

Determining whether two page tables are equal may be done by comparing the physical base addresses of the page table. The notation $PT_i=PT_j$ denotes the base addresses of the page tables for logical processors i and j are the same; hence, $PT_i=PT_j$ means that $phys(PT_i)=phys(PT_j)$.

As a result, the following heuristic may be applied: If $PT_i=PT_j$, then logical processors i and j must arrive at identical translations for virtual address V, and therefore, the TLB entry for this translation can be shared. If $PT_i \neq PT_j$, then logical processors i and j may arrive at different translations for virtual address V, and therefore, the TLB entry for this translation should not be shared. (The latter is a conservative conclusion, in that they could share the translations if the translations were found to be identical.)

The page table base address for page table $PT_i$, is typically stored as state information on a per-logical-processor basis. The processor may store these addresses as either virtual or physical addresses; however, comparisons are made based on physical addresses. Note that in a processor that uses address space identifiers (ASIDs), the page table base address typically does not change once the system is booted.

Figure 11:
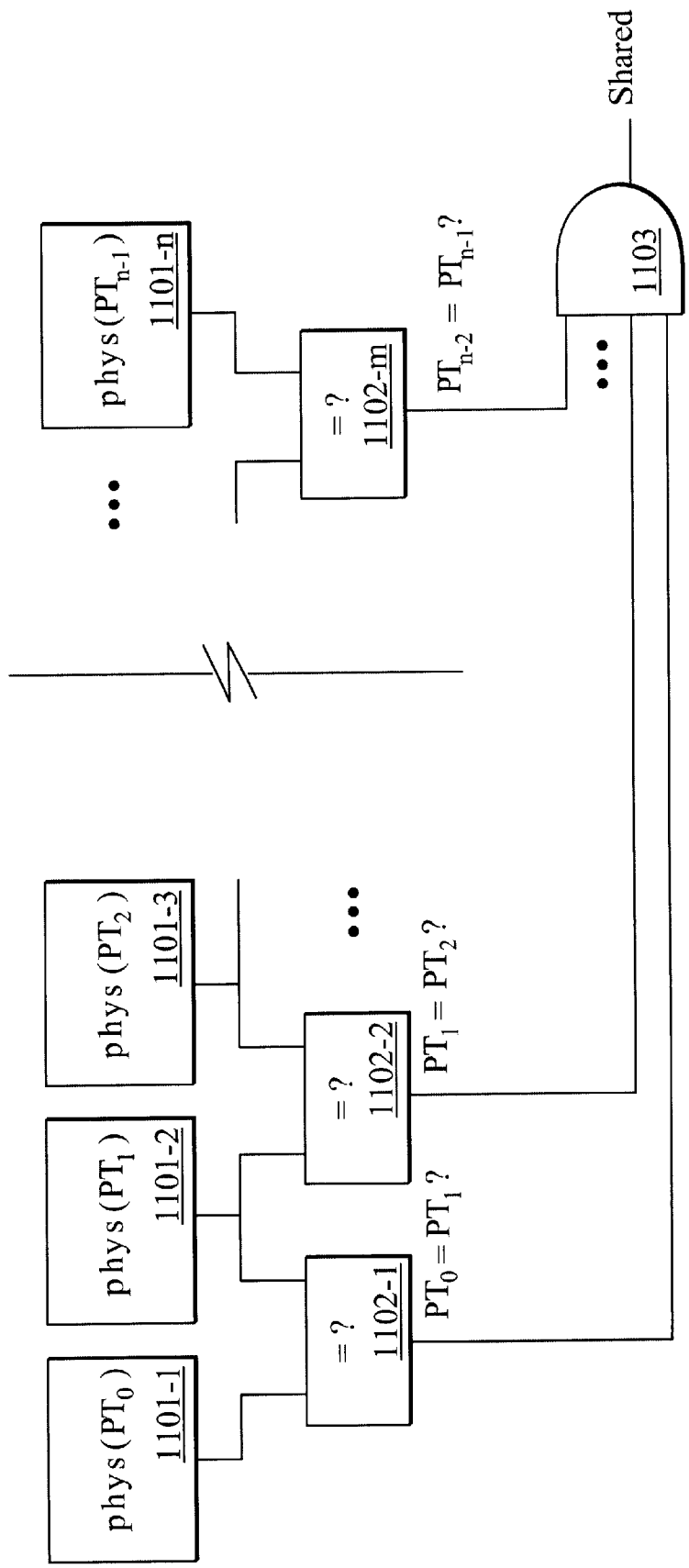
FIG. 11 illustrates control logic circuitry to determine whether entries of a TLB can be shared, according to a first embodiment.

FIG. 11 shows a simple implementation, which involves comparing the page table physical base addresses 1101, phys(PT), for n logical processors which share a TLB. If the addresses 1101 all match, then all logical processors can share any hardware-installed entry. If the page table physical base addresses do not match, then hardware-installed entries must always be installed as private to a particular logical processor.

The elements shown in FIG. 11 may be implemented within the processor, and particularly within the TLB control logic of the processor (e.g., control logic 604, 704 and/or 804 discussed above), although that is not necessarily so.

Thus, the embodiment of FIG. 11 includes m comparators 1102 (where m=n−1), which compare the contents of the n physical page table addresses 1101 and output their comparison results to an AND gate 1103. Note that the illustrated the embodiment takes advantage of the transitivity property to perform the comparisons; i.e., if A=B and B=C, then A=C. If the physical page table addresses are all the same, then the single-bit "Shared" signal output by the AND gate 1103 is true, and the TLB control logic should install virtual address translations as shared by all n logical processors. If any of the page table addresses are not the same, "Shared" is false, and the hardware installs translations as private. The "Shared" signal is used in the TLB control logic to determine the sharing policy to apply to installed translations. It will be recognized that the state of the Shared signal is updated whenever one of the page table physical base addresses 1101 changes.

If the system software specifies the page table base addresses using virtual addresses, the physical translations should be cached in this hardware for use by the sharing circuitry, as this disclosed hardware uses the physical base addresses of the page tables. In such an embodiment, the page table physical base addresses 1101 in FIG. 11 represent the cached physical translations. The virtual to physical translation for the page table should always be readily available in the processor.

When the software uses virtual addresses to specify the page table base addresses, the value of the physical page table base address, $phys(PT_i)$, that is cached by the above-described hardware for a given logical processor i should be re-translated under either of the following circumstances: 1) logical processor i installs or deletes a translation for virtual address V and V=virt($PT_i$), or 2) logical processor i performs a context switch (assuming, for example, that the processor modifies the ASID of a virtual page table base address during a context switch).

The simple embodiment just described only allows sharability to be determined at a very coarse grain; either all logical processors share an entry, or none share an entry. Another embodiment for implementing the sharing heuristic, which will now be described, allows determination of sharability at per-logical processor granularity. Of course, the TLB itself must be able to share entries at this granularity as well.

Figure 12:
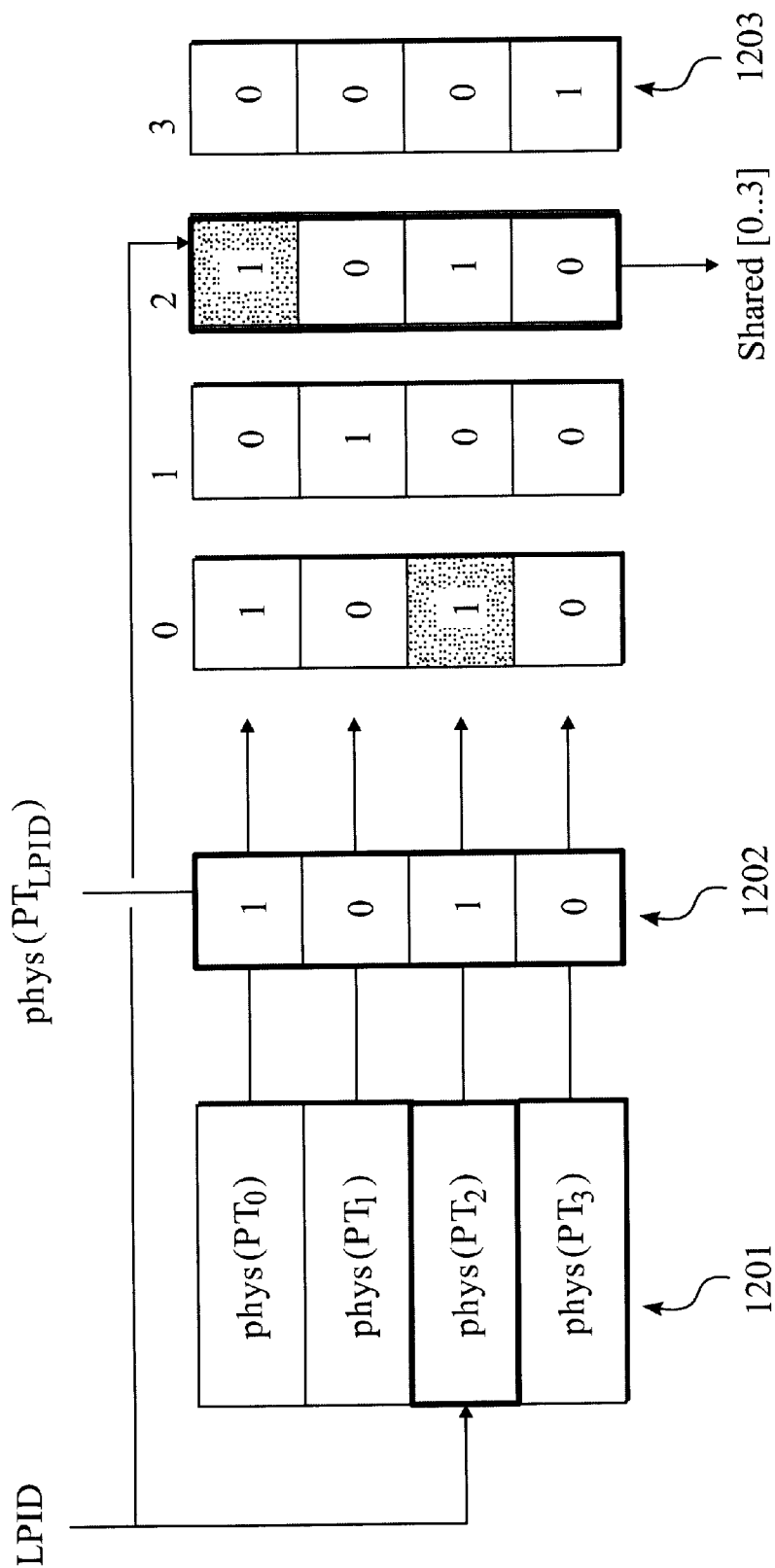
FIG. 12 illustrates control logic circuitry to determine whether entries of a TLB can be shared, according to a second embodiment.

As shown in FIG. 12, there are three main pieces to this second embodiment: a Page Table (PT) array 1201, a Compare vector 1202, and a Share Vector array 1203. These elements may be implemented within the processor, and particularly within the TLB control logic, although that is not necessarily so. The PT array 1201 contains the physical page table addresses, $phys(PT_i)$ for each logical processor. The logical processor identifier (LPID) of the logical processor that is performing a TLB operation (install, purge, set page table base, etc.) indexes this array. The Compare vector 1202 holds the results of comparing page table physical base addresses stored in the PT array 1201 with the physical base address of the page table identified by the LPID. The Share Vector array 1203 holds in its columns a separate sharing vector, Shared[0 . . . n], for each of the n logical processors. For example, the entry in row i of column j is 1 if logical processors i and j can share translations, otherwise the entry is 0. Note that the specific values shown in the Compare vector 1202 and the Shared Vector array 1203 in FIG. 12 are for illustrative purposes only.

When performing a TLB operation, the LPID of the logical processor performing the operation selects a column of the Shared Vector array 1203. The bits of the selected Shared vector are used in the control logic of the TLB. For example, in an embodiment with two logical processors, the bits of the selected Shared vector may be used as inputs $Share_0$ and $Share_1$ in control logic 804 in FIG. 8. The correct values must also be driven on the Install Shared and Install Private signals. Typically, Install Shared will be true if the Shared vector indicates more than one logical processor, while Install Private would be true if the Shared vector indicates only one logical processor.

Figure 13:
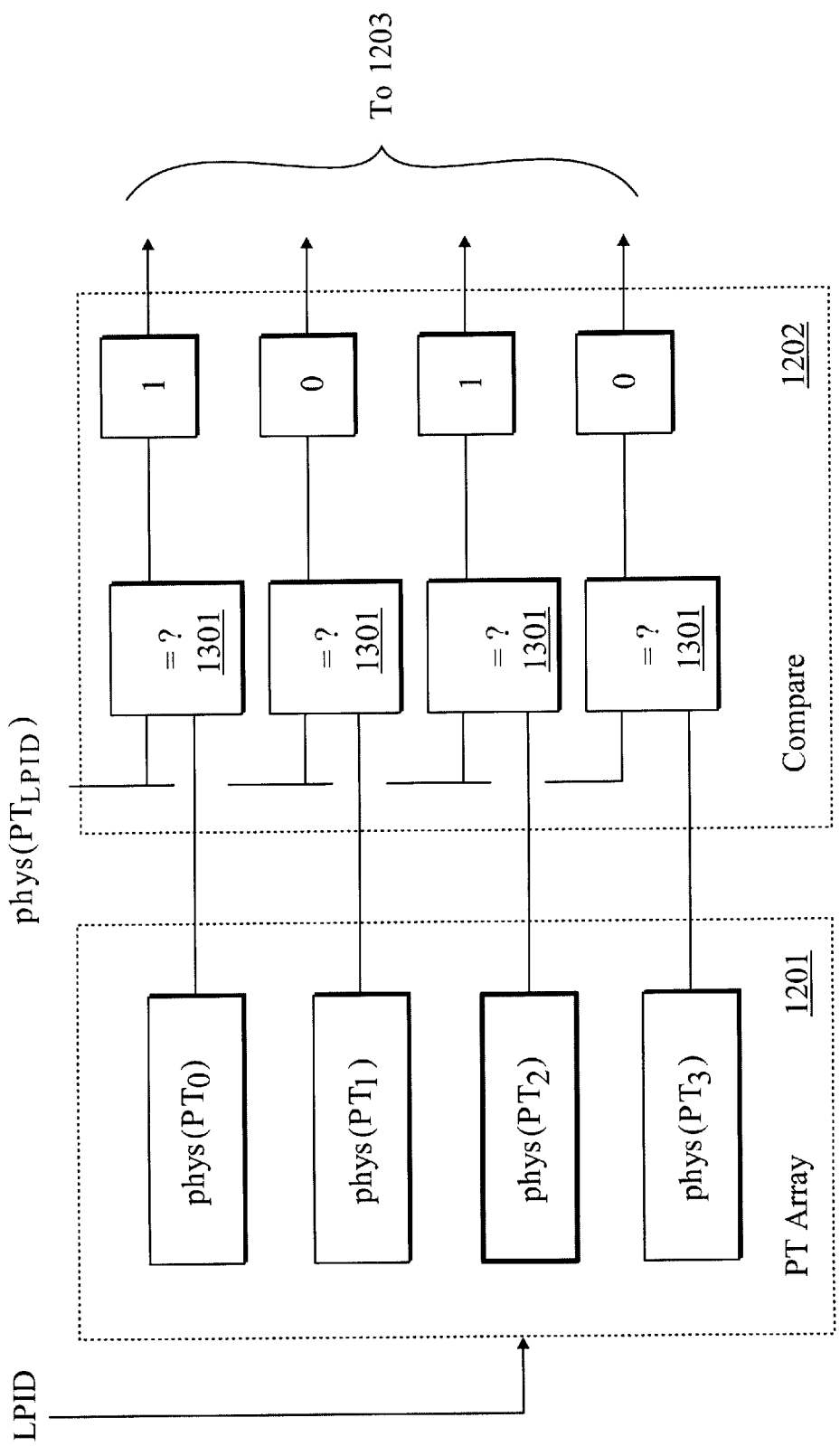
FIG. 13 illustrates the compare vector of FIG. 12 in greater detail.

FIG. 13 focuses on the Compare vector 1202 and PT Array 1203 to illustrate how the compare operations are performed. As shown, the Compare vector 1202 includes a number of comparators 1301, one for each logical processor. More specifically, each row of the Compare vector 1202 has a comparator 1301 that compares the value of a new page table base address, $phys(PT_{LPID})$, with the current value of the page table base address for each logical processor. As described further below, this comparison only occurs when changing the value of a physical page table base address.

To better understand the operation of this embodiment, consider two situations: 1) installing a translation in the TLB, and 2) changing the page table base address. When installing a translation in the TLB, the LPID is used to select a column of values from the Share Vector array. This column is provided to the TLB as the "Shared" bit vector: a 1 at bit i implies that the translation being installed by the logical processor can be shared with logical processor i. The TLB control logic is responsible for using this information to drive its sharing algorithm. Note that the PT Array 1201 and Compare vector 1202 do not participate in this process.

When changing the page table base address, the entire structure must be updated. The update begins by updating the PT Array 1201. The LPID of the logical processor that is changing its page table base address indexes the PT Array 1201. The PT Array 1201 operates as follows when logical processor i is changing its page table base address to $phys(PT_i)$. First, $phys(PT_i)$ is written into entry i of the PT array. Next, the Compare vector 1202 compares $phys(PT_j)$ to $phys(PT_i)$. If $phys(PT_j)=phys(PT_i)$, the compare vector 1202 then sets its row j to 1; otherwise, the Compare vector 1202 sets its row j to 0. At this point, the Compare vector 1202 contains the sharing vector for logical processor i. Now, the value of the Compare vector 1202 is written into column i of the Share Vector Array 1203, completing the updates.

The cells in the Shared Vector array 1203 may be connected such that writing a value to row i of column j also writes the same value into row j of column i; that is, if $phys(PT_i)=phys(PT_j)$, then $phys(PT_j)=phys(PT_i)$ must also be true. The shaded cells in the Share Vector array 1203 in FIG. 12 are two cells that may be connected in this fashion.

As with the above embodiment, if the system software specifies the page table base addresses using virtual addresses, the physical translations should be cached in this hardware for use by the sharing circuitry, as this hardware uses the physical base addresses of the page tables. In such an embodiment, the PT Array 1201 represents the cached physical addresses. Also as in the above embodiment, the virtual addresses specify the page table base addresses, the value of the physical page table base address, $phys(PT_i)$, that is cached by the above-described hardware for a given logical processor i must be re-translated under either of the following circumstances: 1) logical processor i installs or deletes a translation for virtual address V and $V=virt(PT_i)$, or 2) logical processor i performs a context switch (again assuming, for example, that the processor modifies the ASID of a virtual page table base address during a context switch).

The above description illustrates preferred embodiments of the present invention. From the discussion above it should also be apparent that the invention can be modified in arrangement and detail by those skilled in the art without departing from the principles of the present invention within the scope of the accompanying claims.

What is claimed is:

1. A method comprising:
   maintaining a plurality of page table physical addresses;
   caching the page table physical addresses as translations of corresponding page table virtual addresses;
   compraring an updated page table physical address to one of the plurality of page table physical addresses; and
   determining whether two or more of a plurality of logical processors can share a virtual address translation based on an outcome of said comparing.

2. A method as recited in claim 1, wherein said determining comprises updating a sharing indication in a translation lookaside buffer (TLB).

3. A method as recited in claim 2, further comprising controlling access to a virtual address translation stored in the TLB based on the sharing status indication.

4. A method as recited in claim 1, wherein said comparing comprises comparing the updated page table physical address with a page table physical address of each other logical processor of the plurality of logical processors.

5. A method as recited in claim 4, wherein said determining comprises generating an indication that the virtual address translation may be shared by the logical processors if the updated page table physical address matches each other page table physical address of the plurality of page table physical addresses.

6. A method as recited in claim 4, further comprising updating a set of values, each value corresponding to a different one of the page table physical addresses, by causing each value to indicate whether the corresponding page table physical address matches the updated page table physical address.

7. A method as recited in claim 6, wherein said determining further comprises using the updated set of values to update a set of share vectors, each share vector corresponding to a different one of the logical processors, each share vector indicating the logical processors which can share virtual address translations.

8. A method as recited in claim 7, further comprising installing a virtual address translation in a translation lookaside buffer (TLB), by
   selecting one of the share vectors, and
   using the selected share vector to determine which of the logical processors may share the virtual address translation.

9. A method as recited in claim 8, wherein said using the selected share vector to determine which of the logical processors may share the virtual address translation comprises
   using the selected share vector to provide a sharing indication in the TLB corresponding to the virtual address translation.

10. A method as recited in claim 1, further comprising updating at least one of the cached physical page table addresses in response to installing or deleting a transition for a base address of a page table.

11. A method as recited in claim 1, further comprising updating at least one of the cached physical page table addresses in response to performing a context switch.

12. A method comprising:
storing a plurality of page table addresses, each of the page table physical addresses corresponding to a different one of a plurality of logical processors, wherein the stored page table physical addresses are cached translations of page table virtual addresses;
comparing the page table physical addresses with each other;
generating an indication of whether the virtual address translations may be shared by the logical processors based on an outcome of said comparing, by
generating an indication that the virtual address translations may be shared by the logical processors if the page table physical addresses are the same, and
generating an indication that the virtual address translations may not be shared by the logical processors if the page table physical addresses are not the same; and
using the indication to update a sharing status indication in a translation lookaside buffer (TLB).

13. A method as recited in claim 12, further comprising installing a virtual address translation in the TLB based on the indication of whether the virtual address translations may be shared.

14. A method as recited in claim 12, further comprising controlling access to a virtual address translation stored in the TLB based on the sharing status indication.

15. A method as recited in claim 12, further comprising updating at least one of the cached translations in response to installing or deleting a translation for a base address of a page table.

16. A method as recited in claim 12, further comprising updating at least one of the cached translations in response to performing a context switch.

17. A method comprising:
storing a plurality of page table physical addresses, each of the page table physical addresses corresponding to a different one of a plurality of logical processors, wherein the page table physical addresses are page table physical base addresses;
updating one of the page table physical addresses based on a first logical processor identifier (ID);
using the first logical processor ID to update a set of values, each value corresponding to a different one of the page table physical addresses, such that each value indicates whether the corresponding page table physical address matches a page table physical address associated with the first logical processor ID;
using the updated set of values to update a set of share vectors, each share vector corresponding to a different one of the logical processors, each share vector indicating the logical processors which can share virtual address translations; and
installing a virtual address translation in a translation lookaside buffer (TLB) on behalf of one of the logical processors, said one of the logical processors being identified by a second logical processor ID, wherein said installing includes
using the second logical processor ID to select one of the share vectors, and
using the selected share vector determine which of the logical processors may share the virtual address translation.

18. A method as recited in claim 17, wherein said using the selected share vector to determine which of the logical processors may share the virtual address translation comprises
using the selected share vector to provide a sharing indication in the TLB corresponding to the virtual address translation.

19. A method as recited in claim 17, wherein the stored physical page table physical addresses are cached translations of page table virtual addresses.

20. A method as recited in claim 19, further comprising updating at least one of the stored page table physical addresses in response to installing or deleting a translation for a base address of a page table.

21. A method as recited in claim 19, further comprising updating at least one of the stored page table physical addresses in response to performing a context switch.

22. A machine-readable storage medium having stored therein sequences of instructions which configure a machine to perform a method comprising:
maintaining a plurality of page table addresses, each of the page table physical addresses corresponding to a page table of a different one of a plurality of logical processors, wherein the page table addresses are physical addresses; and
determining whether the logical processors can share a virtual address translation based on a comparison of page table addresses.

23. A machine-readable storage medium as recited in claim 22, wherein said determining comprises comparing the updated page table physical addresses with a page table physical address of each other logical processor of the plurality of logical processors.

24. A machine-readable storage medium as recited in claim 22, wherein said determining comprises determining that the logical processors can share a virtual address translation if page table addresses associated with the logical processors match.

25. A machine-readable storage medium as recited in claim 22, wherein said determining comprises updating a sharing indication in a translation lookaside buffer (TLB).

26. A machine-readable storage medium as recited in claim 25, further comprising controlling access to a virtual address translation stored in the TLB based on the sharing status indication.

* * * * *

UNITED STATES PATENT AND TRADEMARK OFFICE
CERTIFICATE OF CORRECTION

PATENT NO. : 6,728,858 B2
DATED : April 27, 2004
INVENTOR(S) : Willis et al.

It is certified that error appears in the above-identified patent and that said Letters Patent is hereby corrected as shown below:

<u>Column 14,</u>
Line 63, delete "transition" and insert -- translation --.

<u>Column 16,</u>
Line 6, after "vector", insert -- to --.
Line 18, delete the first occurrence of "physical".
Line 41, delete "addresses" and insert -- address --.

Signed and Sealed this

Tenth Day of August, 2004

JON W. DUDAS
*Acting Director of the United States Patent and Trademark Office*